United States Patent
Bang

[11] Patent Number: 5,870,086
[45] Date of Patent: Feb. 9, 1999

[54] POWER SAVING DISPLAY DEVICE AND METHOD FOR CONTROLLING POWER THEREOF

[75] Inventor: Jeong-Ho Bang, Kyungki-do, Rep. of Korea

[73] Assignee: SamSung Electronics Co., Ltd., Kyungki-do, Rep. of Korea

[21] Appl. No.: 914,028

[22] Filed: Aug. 14, 1997

[30] Foreign Application Priority Data

Aug. 14, 1996 [KR] Rep. of Korea .................. 33804/1996

[51] Int. Cl.[6] ....................................................... G09G 5/00
[52] U.S. Cl. ........................ 345/212; 345/210; 345/211; 345/214
[58] Field of Search .................................. 345/210, 211, 345/212, 213, 214, 215

[56] References Cited

U.S. PATENT DOCUMENTS

| | | | |
|---|---|---|---|
| 5,315,311 | 5/1994 | Honkala | 345/212 |
| 5,375,245 | 12/1994 | Solhjell | 345/212 |
| 5,389,952 | 2/1995 | Kikinis | 345/213 |
| 5,481,299 | 1/1996 | Coffey | 345/212 |
| 5,616,988 | 4/1997 | Kim | 345/212 |

*Primary Examiner*—Vijay Shankar
*Attorney, Agent, or Firm*—Robert E. Bushnell, Esq.

[57] ABSTRACT

A power saving display device and a method for controlling power thereof. The power saving display device comprises a main power supply circuit for converting an output voltage from a power rectifier into desired voltages to be supplied to components in the display device, a synchronous signal discriminator for discriminating whether horizontal and vertical synchronous signals are inputted and generating first and second control signals for power management in accordance with the discriminated result, a main power interrupter for interrupting the operation of the main power supply circuit in response to the first control signal from the synchronous signal discriminator, an auxiliary power supply circuit being continuously operated in response to the output voltage from the power rectifier although the main power supply circuit is interrupted in operation, a heater power regulation circuit for varying a voltage being supplied to a heater of a cathode ray tube or maintaining it constantly in response to the second control signal from the synchronous signal discriminator, and a heater power connector for supplying an output voltage from the auxiliary power supply circuit to the heater power regulation circuit when the main power supply circuit is interrupted in operation.

13 Claims, 4 Drawing Sheets

POWER SAVING DISPLAY DEVICE AND METHOD FOR CONTROLLING POWER THEREOF

CLAIM OF PRIORITY

This application makes reference to, incorporates the same herein, and claims all benefits accruing under 35 U.S.C §119 from an application entitled Power Saving Display Device And Method For Controlling Power Thereof earlier filed in the Korean Industrial Property Office on 14 Aug. 1997, and there duly assigned Serial No. 96-33804 by that Office.

FIELD OF THE INVENTION

The present invention relates in general to a power saving display device having a display power management system (referred to hereinafter as "DPMS") function, and more particularly to a power saving display device and a method for controlling power thereof, in which the power is supplied to only desired components at a suspend state so that the suspend state can be maintained at the minimum consumption power.

BACKGROUND OF THE INVENTION

Generally, a display device comprises control means for saving consumption power. In one approach, the control means may be implemented by a DPMS, proposed by Video Electronics Standard Association (VESA) in U.S.A.

The DPMS functions to manage power of a display device, which is one of the peripheral devices of a computer, according to a used state of the computer to save the power.

In conformity with the VESA, the computer selectively supplies or blocks horizontal and vertical synchronous signals to the display device according to its used state, and the display device manages power according to the presence of the horizontal and vertical synchronous signals from the computer.

The power management states are classified into an on state, a stand-by state, a suspend state and a power off state. Both the horizontal and vertical synchronous signals are applied at the on state, and only the vertical synchronous signal is applied at the stand-by state. Only the horizontal synchronous signal is applied at the suspend state, and either the horizontal or vertical synchronous signal is not applied at the power off state.

The power management state is sequentially changed to the on state stand-by state suspend state power off state with the continuous lapse of unused time of the computer. It is commonly prescribed that consumption power of the display device be about 80W at the on state, 65W or less at the stand-by state, 25W or less at the suspend state and 5W or less at the power off state.

SUMMARY OF THE INVENTION

An object of the present invention to provide a power saving display device and a method for controlling power thereof, in which, when a power management state is a suspend state, an auxiliary power supply circuit is operated to supply power to only components essential to the suspend state, whereas a main power supply circuit is not operated, so that unnecessary power consumption can be prevented.

In accordance with one aspect of the present invention, there is provided a power saving display device comprising power rectification means for converting commercial alternating current power into direct current power; main power supply means for converting an output voltage from the power rectification means into desired voltages to be supplied to components in the display device; synchronous signal discrimination means for discriminating whether horizontal and vertical synchronous signals are inputted and generating first and second control signals for power management in accordance with the discriminated result; main power interruption means for interrupting the operation of the main power supply means in response to the first control signal from the synchronous signal discrimination means; auxiliary power supply means being continuously operated in response to the output voltage from the power rectification means although the main power supply means is interrupted in operation; heater power regulation means for varying a voltage being supplied to a heater of a cathode ray tube or maintaining it constantly in response to the second control signal from the synchronous signal discrimination means; and heater power connection means for supplying an output voltage from the auxiliary power supply means to the heater power regulation means when the main power supply means is interrupted in operation.

In accordance with another aspect of the present invention, there is provided a power saving display device comprising power rectification means for converting commercial alternating current power into direct current power; main power supply means for converting an output voltage from the power rectification means into desired voltages to be supplied to components in the display device; synchronous signal discrimination means for discriminating whether horizontal and vertical synchronous signals are inputted and generating first and second control signals for power management in accordance with the discriminated result; main power interruption means for interrupting the operation of the main power supply means in response to the first control signal from the synchronous signal discrimination means; auxiliary power supply means being continuously operated in response to the output voltage from the power rectification means although the main power supply means is interrupted in operation; heater power regulation means for varying a voltage being supplied to a heater of a cathode ray tube or maintaining it constantly in response to the second control signal from the synchronous signal discrimination means; and heater power connection means for supplying an output voltage from the auxiliary power supply means to the heater power regulation means regardless of the operation of the main power supply means.

In accordance with still another aspect of the present invention, there is provided a method for controlling power of a display device according to whether horizontal and vertical synchronous signals are inputted, comprising the first step of interrupting main power if only the horizontal synchronous signal is inputted; and the second step of supplying auxiliary power to a heater of a cathode ray tube when the main power is interrupted.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
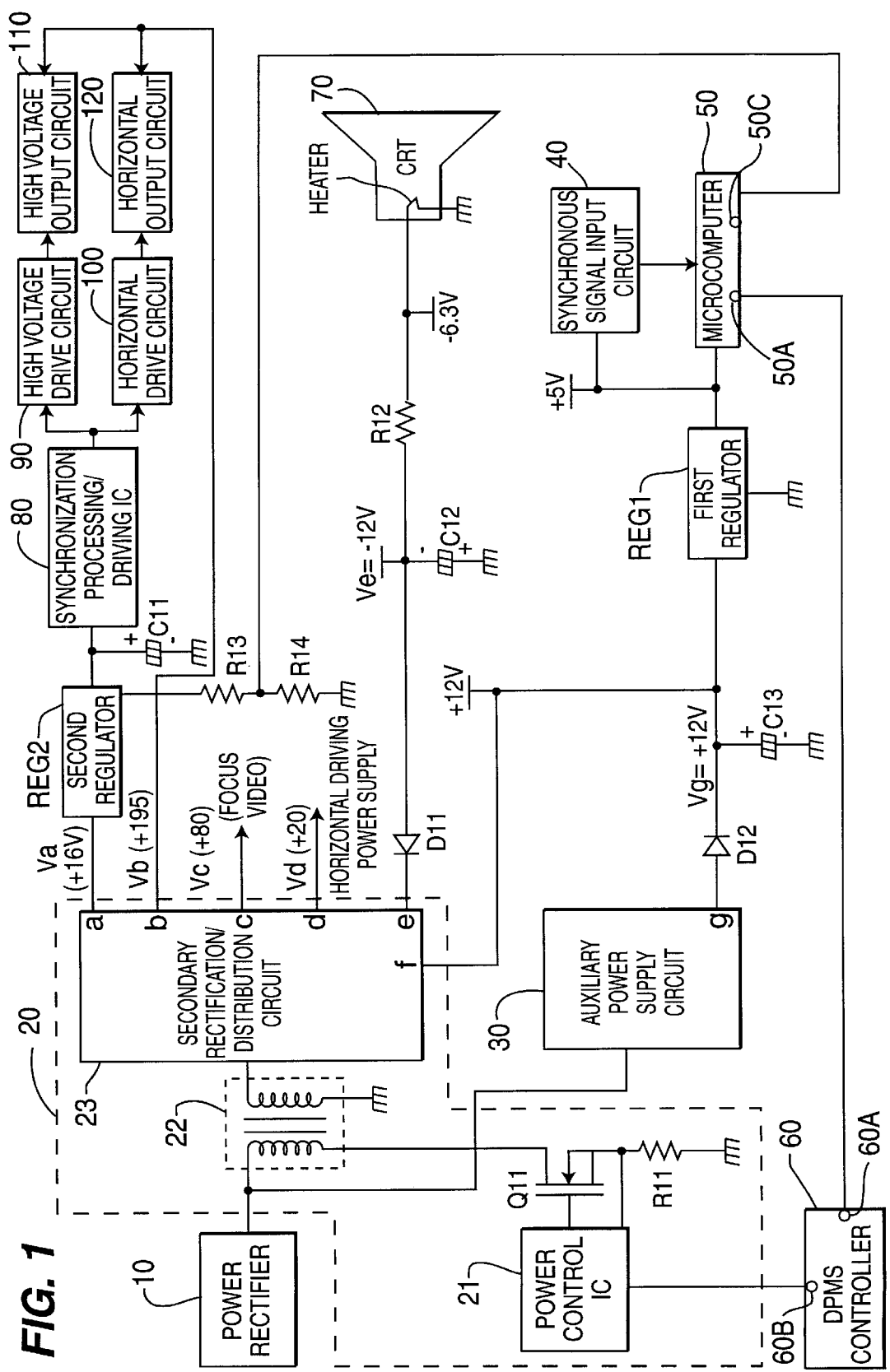
FIG. 1 is a block diagram illustrating the construction of a display device which is applied to a computer.

FIG. 1 is a block diagram illustrating the construction of a cathode ray tube (CRT) display device which is applied to a computer. As shown in this drawing, the display device comprises a main power supply circuit 20 for supplying power to components in the display device. Main power supply circuit 20 includes a field effect transistor Q11 having its gate terminal connected to an output terminal of a power control integrated circuit (IC) 21, its drain terminal connected to one side of a primary coil of a switching transformer 22 and its source terminal connected in common to an input terminal of power control IC 21 and to a ground voltage terminal through a current detection resistor R11.

The display device further comprises a power rectifier 10 for rectifying alternating current (AC) power into direct current (DC) power. Power rectifier 10 includes its output terminal connected to the other side of the primary coil of switching transformer 22. Switching transformer 22 also includes a secondary coil having one side connected to the ground voltage terminal and another side connected to an input terminal of a secondary rectification/distribution circuit 23 in main power supply circuit 20. The output terminal of power rectifier 10 is also connected to an input terminal of an auxiliary power supply circuit 30.

Secondary rectification/distribution circuit 23 has a first output terminal a connected to an input terminal of a second regulator REG2, for outputting a voltage Va of about 16V thereto. Second regulator REG2 has its output terminal connected to an input terminal of a synchronization processing/driving IC 80, and a smoothing capacitor C11 has its positive pole connected between the output terminal of second regulator REG2 and the input terminal of synchronization processing/driving IC 80 and its negative pole connected to the ground voltage terminal. Synchronization processing/driving IC 80 has its output terminal connected to one input terminal of a high voltage output circuit 110 through a high voltage drive circuit 90. The output terminal of synchronization processing/driving IC 80 is also connected to one input terminal of a horizontal output circuit 120 through a horizontal drive circuit 100. High voltage output circuit 110 and horizontal output circuit 120 have their other input terminals connected in common to a second output terminal b of secondary rectification/distribution circuit 23 to input a voltage Vb of about 195V therefrom.

Secondary rectification/distribution circuit 23 has a third output terminal c connected in common to input terminals of video output and horizontal focus circuits (not shown), for outputting a voltage Vc of about 80V thereto, and a fourth output terminal d connected in common to input terminals of horizontal driving power supply circuits (not shown), for outputting a voltage Vd of about 20V thereto. The secondary rectification/distribution circuit 23 has a fifth output terminal e connected to a cathode of a diode D11, for outputting a voltage Ve of about -12V thereto. Secondary rectification/distribution circuit 23 has a sixth output terminal f connected to an input terminal of a first regulator REG1, for outputting a voltage Vf of about 12V thereto.

Diode D11 has its anode connected to a heater of a CRT 70 through a voltage drop resistor R12, for applying a voltage of about -6.3V thereto to operate it. A smoothing capacitor C12 has its negative pole connected the node between the anode of diode D11 and resistor R12 and its positive pole connected to the ground terminal.

Auxiliary power supply circuit 30 has its output terminal g connected to an anode of a diode D12, for outputting a voltage Vg of about 12V thereto. Diode D12 has its cathode connected to the input terminal of first regulator REG1. A smoothing capacitor C13 has its positive pole connected to a node between the cathode of diode D12 and the input terminal of first regulator REG1 and its negative pole connected to the ground voltage terminal. First regulator REG1 has its output terminal connected in common to input terminals of a synchronous signal input circuit 40 and a microcomputer 50, for supplying a voltage of about 5V thereto.

The microcomputer 50 has a first control terminal 50A connected to n off mode terminal 60A of a DPMS controller 60, and a second control terminal 50B connected to a control terminal of second regulator REG2 through voltage dividing resistors R13 and R14.

DPMS controller 60 has its output terminal 60B connected to another input terminal of power control IC 21.

The operation of the CRT display device with the above-mentioned construction will hereinafter be described.

When the power management state is the on state, where both the horizontal and vertical synchronous signals are applied, or the stand-by state where only the vertical synchronous signal is applied, main power supply circuit 20 is normally operated in such a manner that secondary rectification/distribution circuit 23 can normally supply various voltages at its output terminals a–f.

When the power management state is the power off state, however, where neither the horizontal nor vertical synchronous signal are applied, microcomputer 50 outputs an off state logic signal to off mode terminal 60A of DPMS controller 60 at its first control terminal 50A. In response to the off state logic signal from microcomputer 50, DPMS controller 60 provides its output signal to power control IC 21 at its output terminal 60B to turn off field effect transistor Q11.

As field effect transistor Q11 is turned off, no voltage is applied to the primary coil of switching transformer 22, thereby causing main power supply circuit 20 not to be operated. As a result, no voltages are supplied from output terminals a–f of secondary rectification/distribution circuit 23, thereby causing no voltage to be applied to the heater of CRT 70.

On the other hand, an output voltage from power rectifier 10 is applied to auxiliary power supply circuit 30 which then supplies the voltage Vg of about 12V to first regulator REG1. Then, first regulator REG1 supplies a voltage of about 5V to synchronous signal input circuit 40 and microcomputer 50. As a result, microcomputer 50 can continuously check whether synchronous signal input circuit 40 inputs the horizontal and vertical synchronous signals.

At the power off state, as mentioned above, the output voltage from auxiliary power supply circuit 30 is supplied only to microcomputer 50 and synchronous signal input circuit 40, whereas main power supply circuit 20 is not operated. Therefore, the consumption power at the power off state does not exceed 5W, as proposed by the VESA.

When the power management state is the suspend state where only the horizontal synchronous signal is applied, microcomputer 50 does not output the off state logic signal to off mode terminal 60A of DPMS controller 60 at its first control terminal 50A, so as to turn on field effect transistor Q11.

As field effect transistor Q11 is turned on, the output voltage from power rectifier 10 is applied to the primary coil of switching transformer 22, thereby causing main power supply circuit 20 to be operated.

As a result, various voltages are supplied from the output terminals a–f of secondary rectification/distribution circuit 23, thereby causing the corresponding voltage to be applied to the heater of CRT 70.

Noticeably, the corresponding voltage must continuously be supplied to the heater of CRT 70 even at the suspend state because it is prescribed in the VESA that a suspend recovery time be 4 seconds. In other words, much heating time will be required even though power is again supplied to the heater after being cooled due to power cut-off. For this reason, when power is blocked to the heater, the suspend recovery time prescribed in the VESA may not be often satisfied.

Also at the suspend state, microcomputer 50 outputs a control signal at its second control terminal 50B to the control terminal of second regulator REG2 through voltage dividing resistors R13 and R14, so that an output voltage from second regulator REG2 can become low in level.

Thus, although second regulator REG2 inputs the voltage Va from first output terminal a of secondary rectification/distribution circuit 23, it cannot operate synchronization processing/driving IC 80. In result, high voltage drive circuit 90 and horizontal drive circuit 100 cannot be operated.

In other words, high voltage drive circuit 90 and horizontal drive circuit 100 cannot be operated although they input the voltage Vb of about 195V from second output terminal b of secondary rectification/distribution circuit 23.

As mentioned above, in the display device, the consumption power at the suspend state does not exceed 25W, as proposed by the VESA.

At the suspend state, however, in addition to the voltages being supplied to the essential components such as microcomputer 50, synchronous signal input circuit 40 and the CRT heater, the voltages from the output terminals of secondary rectification/distribution circuit 23 are supplied to second regulator REG2 and various other ICs, not shown, resulting in unnecessary power consumption.

Figure 2:
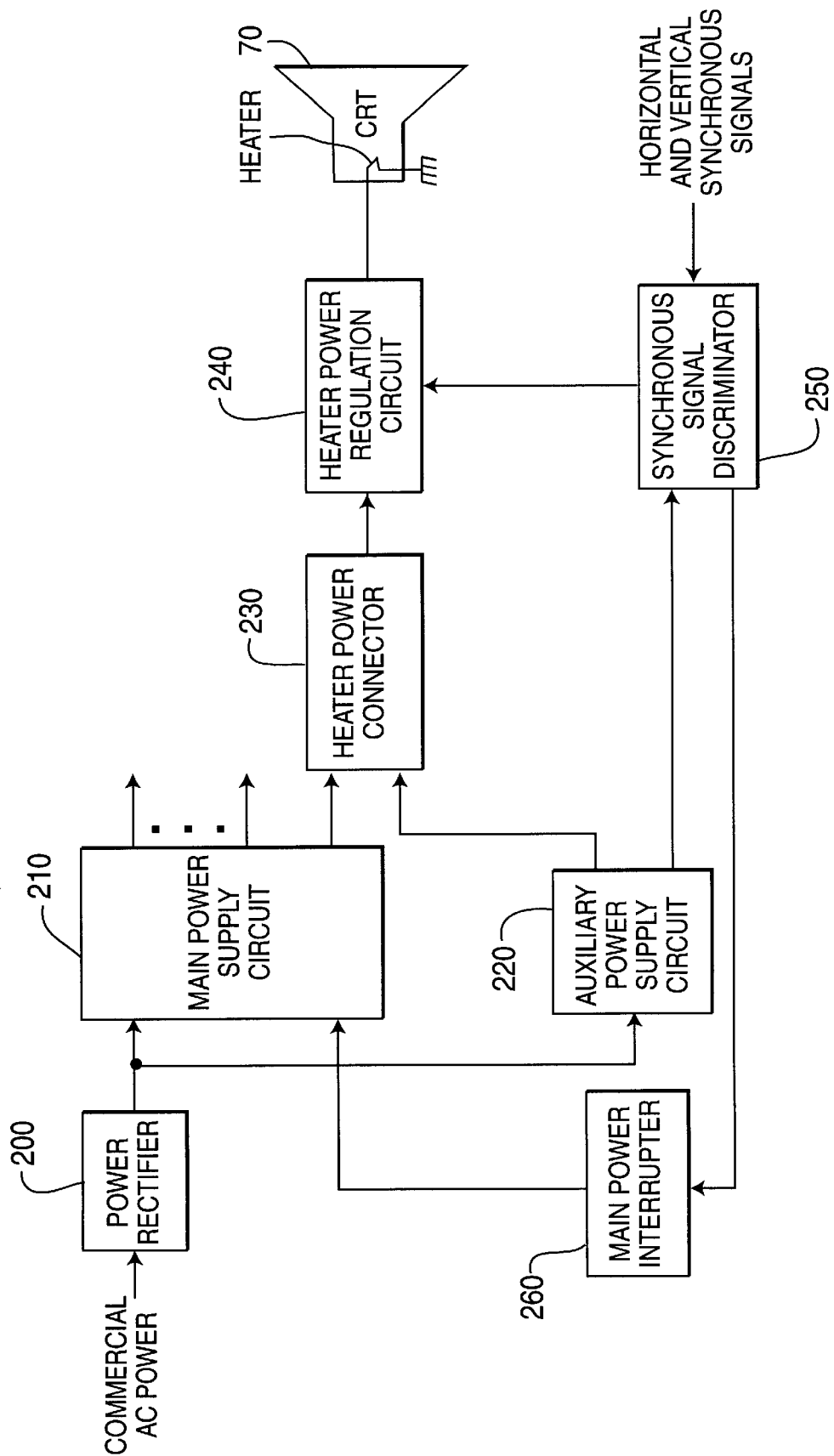
FIG. 2 is a schematic block diagram illustrating the construction of a power saving display device according to the principles of the present invention.

FIG. 2 is a schematic block diagram illustrating the construction of the power saving display device of the present invention. As shown in this drawing, the power saving display device comprises a power rectifier 200 for converting commercial AC power into DC power, and main and auxiliary power supply circuits 210 and 220 for converting an output voltage from power rectifier 200 into desired voltages. Main power supply circuit 210 is interrupted in operation during suspend and power off states in response to an output signal from a main power interrupter 260. Auxiliary power supply circuit 220 is continuously operated although main power supply circuit 210 is interrupted in operation.

The power saving display device further comprises a heater power connector 230 for supplying an output voltage from main power supply circuit 210 to a heater power regulation circuit 240 when main power supply circuit 210 is operated and an output voltage from auxiliary power supply circuit 220 to heater power regulation circuit 240 when main power supply circuit 210 is interrupted in operation. Alternatively, heater power connector 230 may be constructed to supply the output voltage from auxiliary power supply circuit 220 to heater power regulation circuit 240, regardless of the operation of main power supply circuit 210. In this case, heater power connector 230 is not electrically connected with main power supply circuit 210.

The power saving display device further comprises a synchronous signal discriminator 250 for discriminating whether horizontal and vertical synchronous signals are inputted and controlling heater power regulation circuit 240 and main power interrupter 260 for power management in accordance with the discriminated result.

Main power interrupter 260 provides its output signal to main power supply circuit 210 in response to an output signal from synchronous signal discriminator 250 to interrupt the operation of main power supply circuit 210 when the display device is at the suspend and power off states.

Heater power regulation circuit 240 is connected between heater power connector 230 and a heater of CRT 70 to vary a voltage being supplied to the heater or maintain it constantly. When the display device is in the power off state, heater power regulation circuit 240 is stopped in operation in response to another output signal from synchronous signal discriminator 250.

Figure 3:
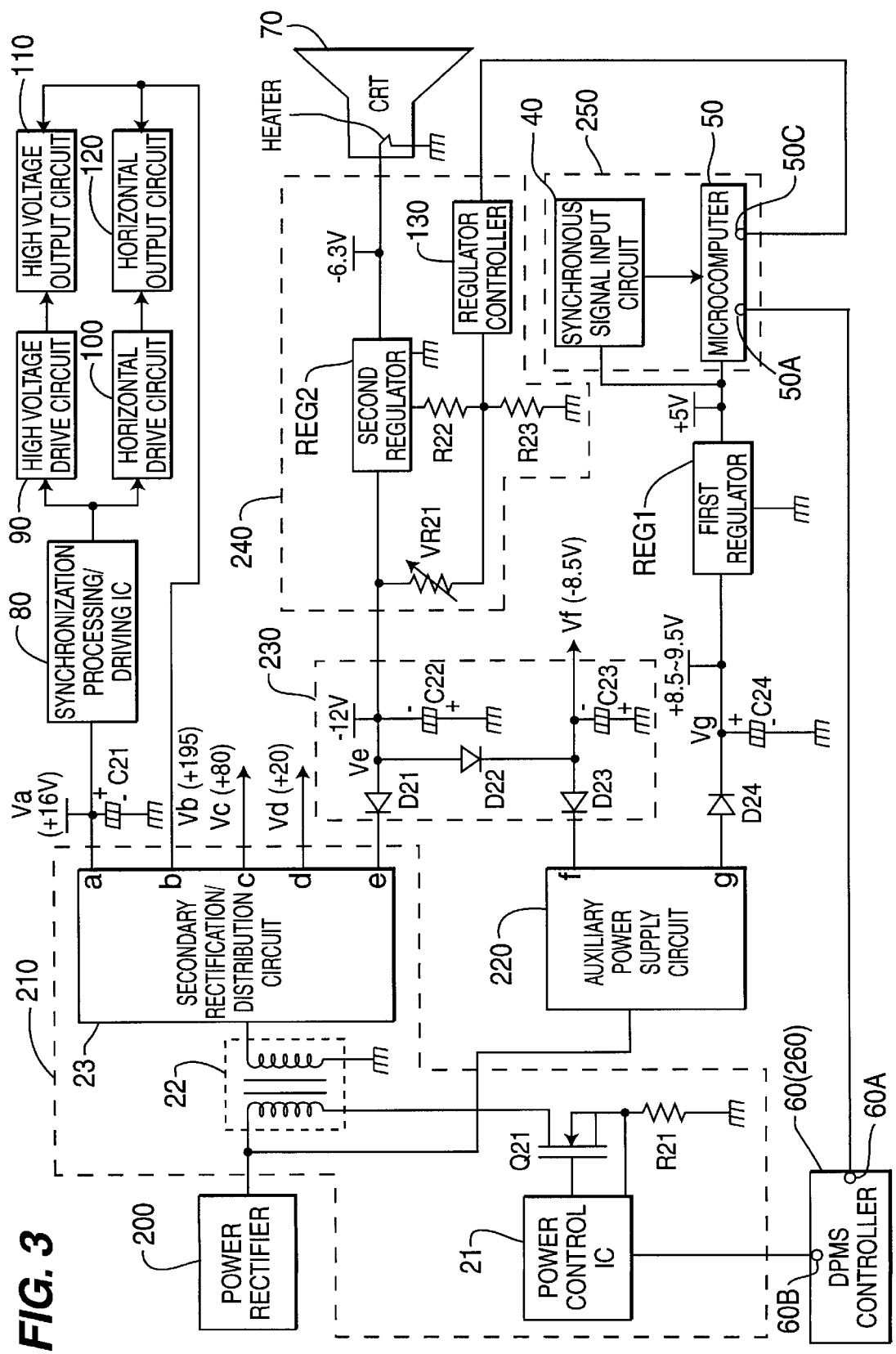
FIG. 3 is a detailed block diagram of the power saving display device of FIG. 2 in accordance with the principles of the present invention.

FIG. 3 is a detailed block diagram of an embodiment of the power saving display device in accordance with the present invention. Some parts in this drawing are the same as those in FIG. 1. Therefore, like reference numerals designate like parts, and a description thereof will thus be omitted.

As shown in FIG. 3, the input terminal of synchronization processing/driving IC 80 which drives high voltage drive circuit 90 and horizontal drive circuit 100 is connected directly to the output terminal a of the secondary rectification/distribution circuit 23.

Microcomputer 50 in synchronous signal discriminator 250 outputs the off state logic signal at its first control terminal 50A to off mode terminal 60A of main power interrupter 260 which is DPMS controller 60 shown in FIG. 1.

Heater power connector 230 includes a diode D21 having its cathode connected to the minus voltage output terminal e of secondary rectification/distribution circuit 23, a diode D23 having its cathode connected to a minus voltage output terminal f of auxiliary power supply circuit 220, and a diode D22 having its anode connected to an anode of diode D21 and its cathode connected to an anode of diode D23.

The anode of diode D22 is also connected to an input terminal of a second regulator REG2 in heater power regulation circuit 240, the output terminal of which is connected to the heater of CRT 70.

Further, heater power regulation circuit 240 includes a regulator control circuit 130 for controlling the operation and output voltage of the second regulator REG2 in response to a control signal from a second control terminal 50C of microcomputer 50. To this end, regulator control circuit 130 has its input terminal connected to second control terminal 50C of microcomputer 50 and its output terminal connected to the input terminal of second regulator REG2 through voltage dividing resistors R22 and R23 and a variable resistor VR21.

The operation of the embodiment of the power saving display device with the above-mentioned construction in accordance with the present invention will hereinafter be described in detail.

First, microcomputer 50 checks whether synchronous signal input circuit 40 inputs the horizontal and vertical synchronous signals. At this time, if synchronous signal input circuit 40 inputs only the horizontal synchronous signal, microcomputer 50 performs the power management at the suspend state.

At the suspend state, microcomputer 50 outputs the off state logic signal to off mode terminal 60A of DPMS controller 60 from first control terminal 50A. In response to the off state logic signal from microcomputer 50, DPMS controller 60 provides its output signal to the power control IC 21 from output terminal 60B to turn off field effect transistor Q21 in main power supply circuit 210.

As field effect transistor Q21 is turned off, main power supply circuit 210 is interrupted in operation. As a result, no voltages are supplied from output terminals a–e of secondary rectification/distribution circuit 23.

At this time, a minus voltage of about –8.5V from output terminal f of auxiliary power supply circuit 220 is supplied to the heater of CRT 70 through diodes D23 and D22 and second regulator REG2 instead of the output voltage from output terminal e of secondary rectification/distribution circuit 23.

In more detail, when main power supply circuit 210 is normally operated, the voltage of –12V from output terminal e of secondary rectification/distribution circuit 23 is lower than the voltage of –8.5V from output terminal f of auxiliary power supply circuit 220. As a result, auxiliary power supply circuit 220 is not electrically connected with second regulator REG2. However, when main power supply circuit 210 is not operated, a current path is formed between output terminal f of auxiliary power supply circuit 220 and second regulator REG2.

Noticeably, the connection of second regulator REG2 between the anode of diode D21, the cathode of which is connected to the minus voltage output terminal e of secondary rectification/distribution circuit 23, and the heater of CRT 70 can overcome a severe voltage variation resulting from a connection using only resistor such as R12 in FIG. 1.

Second regulator REG2 is controlled by an output signal from regulator control circuit 130 which is operated in response to the control signal from second control terminal 50C of microcomputer 50.

Namely, second regulator REG2 is normally operated during the suspend state, but it is stopped in operation at the power off state in response to the control signal from second control terminal 50C of microcomputer 50 to block the voltage supply to the heater of CRT 70, so as to avoid power consumption.

Further, the output value of second regulator REG2 can readily be adjusted externally through variable resistor VR21.

Figure 4:
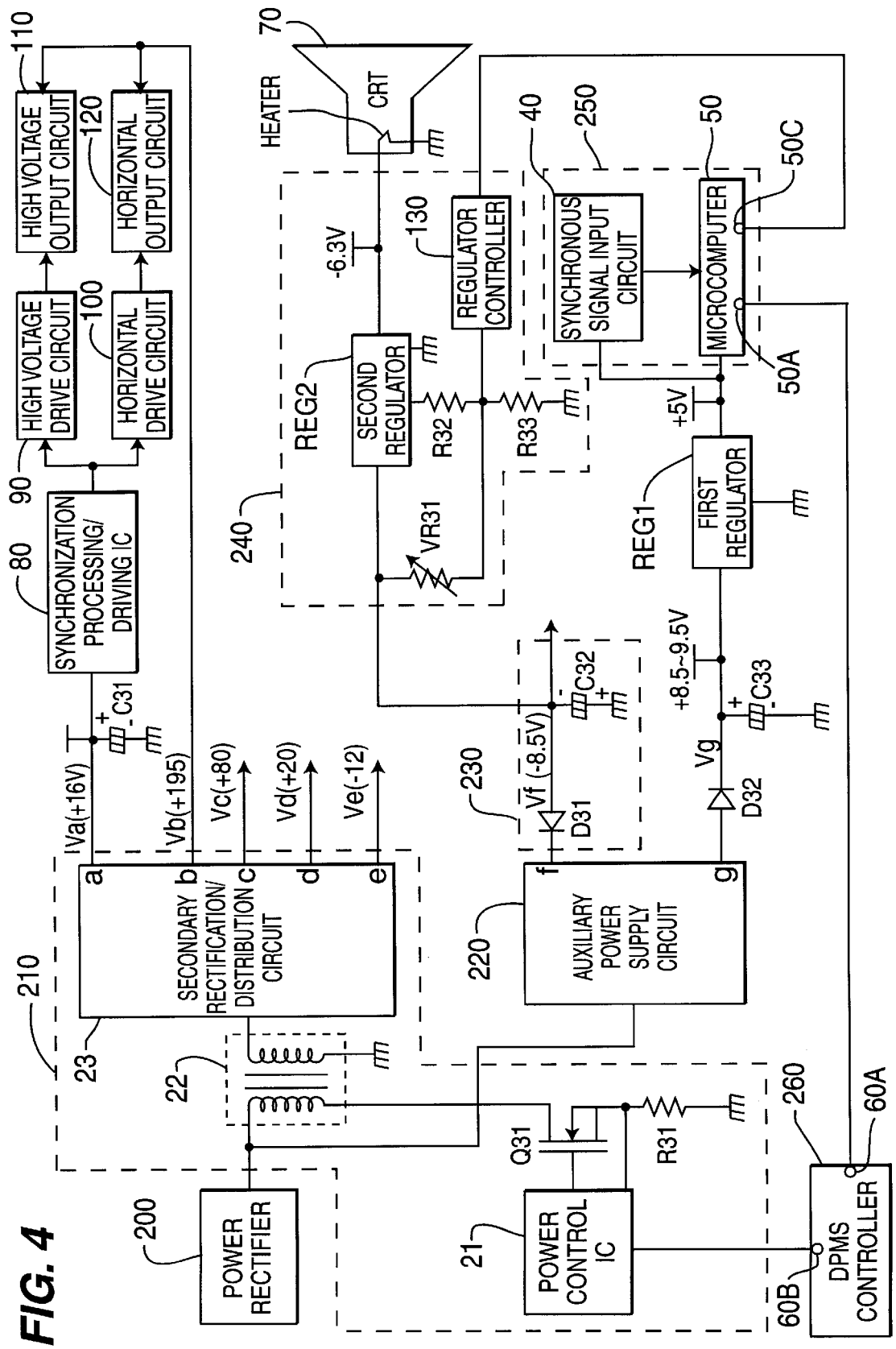
FIG. 4 is a detailed block diagram of an alternative embodiment of the power saving display device of FIG. 2 in accordance with the principle of the present invention.

FIG. 4 is a detailed block diagram of an alternative second embodiment of the power saving display device in accordance with the present invention. The second embodiment is substantially the same in construction and operation as the first embodiment, with the exception that heater power connector 230 in the second embodiment is different in construction and operation from that in the first embodiment. Therefore, only the construction and operation of heater power connector 230 will hereinafter be described in detail with reference to FIGS. 3 and 4.

As seen from FIGS. 3 and 4, heater power connector 230 in the second embodiment is not connected to the minus voltage output terminal e of secondary rectification/distribution circuit 23.

In the second embodiment, heater power connector 230 includes a diode D31 having its cathode connected to the minus voltage output terminal f of auxiliary power supply circuit 220 and its anode connected directly to the input terminal of heater power regulation circuit 240.

The first and second embodiments have a difference in operation as follows:

In the first embodiment, the power supplied to the heater of CRT 70 through second regulator REG2 is provided via the minus voltage output terminal e of secondary rectification/distribution circuit 23 in main power supply circuit 210 during the on state and via the minus voltage output terminal f of auxiliary power supply circuit 220 during the suspend state. In the second embodiment, however, the power supplied to the heater of CRT 70 through second regulator REG2 is provided via minus voltage output terminal f of auxiliary power supply circuit 220 at both the on and suspend states.

As apparent from the above description, according to the present invention, when the power management state is the suspend state, the power is supplied to only the components essential to the suspend state. Therefore, unnecessary power consumption can be prevented, resulting in energy saving.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A power saving display device comprising:

power rectification means for converting commercial alternating current power into direct current power;

main power supply means for converting an output voltage from said power rectification means into desired voltages to be supplied to components in said display device;

synchronous signal discrimination means for generating first and second control signals for power management control by discriminating whether horizontal and vertical synchronous signals are input to said power saving display device, said first control signal generated to interrupt the operation of said main power supply means when only the horizontal synchronous signal is input or when neither the horizontal nor vertical synchronous signals are input;

main power interruption means for interrupting operation of said main power supply means in response to said first control signal from said synchronous signal discrimination means;

auxiliary power supply means being continuously operated in response to an output voltage from said power rectification means even when said main power supply means' operation is interrupted;

heater power regulation means for providing an input voltage to a heater of a cathode ray tube in response to the second control signal from said synchronous signal discrimination means having a first value, and for stopping said input voltage from being provided to said heater in response to the second control signal from said synchronous signal discrimination means having a second value; and heater power connection means for supplying an output voltage form said auxiliary power supply means to said heater power regulation means as said input voltage when said main power supply means' operation is interrupted.

2. The power saving display device as set forth in claim 1, wherein said synchronous signal discrimination means comprises:
   a synchronous signal input circuit for inputting the horizontal and vertical synchronous signals; and
   a microcomputer for discriminating whether the horizontal and vertical synchronous signals are input by said synchronous signal input circuit and for generating said first and second control signals in accordance with a discriminated result.

3. The power saving display device as set forth in claim 1, wherein said auxiliary power supply means is electrically connected with only said synchronous signal discrimination means when said main power supply means' operation is not interrupted and with said synchronous signal discrimination means and said heater of said cathode ray tube when said main power supply means' operation is interrupted.

4. A power saving display comprising:
   power rectification means for converting commercial alternating current power into direct current power;
   main power supply means for converting an output voltage from said power rectification means into desired voltages to be supplied to components in said display device;
   synchronous signal discrimination means for generating first and second control signals for power management control by discriminating whether horizontal and vertical synchronous signals are input to said display device;
   main power interruption means for interrupting operation of said main power supply means in response to said first control signal from said synchronous signal discrimination means;
   auxiliary power supply means being continuously operated in response to an output voltage from said power rectification means even when said main power supply means' operation is interrupted;
   heater power regulation means for providing an input voltage to a heater of a cathode ray tube in response to the second control signal from said synchronous signal discrimination means having a first value, and for stopping said input voltage form being provided to said heater in response to the second control signal from said synchronous signal discrimination means having a second value; and
   heater power connection means for supplying an output voltage from said auxiliary power supply means to said heater power regulation means as said input voltage when said main power supply means' operation is interrupted, wherein said heater power connection means comprises:
      a first diode connected between an output terminal of said main power supply means and a first node;
      second and third diodes connected in series between an output of said auxiliary power supply means and said first node;
      a first capacitor connected between said first node and a ground terminal;
      a second capacitor connected between a second node and said ground terminal, said second node being connected in common to said second and third diodes; and
      said first node being connected to said heater power regulation means.

5. The power saving display device as set forth in claim 1, wherein said synchronous signal discrimination means provides said second control signal to said heater power regulation means when at least one of said horizontal and vertical synchronous signals is input.

6. A power saving display device comprising:
   power rectification means for converting commercial alternating current power into direct current power;
   main power supply means for converting an output voltage from said power rectification means into desired voltages to be supplied to components in said display device;
   synchronous signal discrimination means for generating first and second control signals for power management control by discriminating whether horizontal and vertical synchronous signals are input to said display device;
   main power interruption means for interrupting operation of said main power supply means in response to said first control signal from said synchronous signal discrimination means;
   auxiliary power supply means being continuously operated in response to an output voltage from said power rectification means even when said main power supply means' operation is interrupted;
   heater power regulation means for providing an input voltage to a heater of a cathode ray tube in response to the second control signal from said synchronous signal discrimination means having a first value, and for stopping said input voltage from being provided to said heater in response to the second control signal from said synchronous signal discrimination means having a second value; and
   heater power connection means for supplying an output voltage from said auxiliary power supply means to said heater power regulation means as said input voltage when said main power supply means' operation is interrupted, wherein said heater power regulation means comprises:
      a regulator circuit having a first input terminal connected to an output terminal of said heater power connection means and a second input connected to a ground terminal via first and second resistors connected in series;
      a variable resistor connected between said input terminal and a node connecting said first resistor to said second resistor; and
      a regulator controller having an input connected to receive said second control signal output from said synchronous signal discrimination means and an output connected to said node.

7. The power saving display device as set forth in claim 4, wherein said heater power regulation means comprises:
   a regulator circuit having a first input terminal connected to said first node and a second input connected to said ground terminal via a first resistor and a second resistor connected in series;
   a variable resistor connected between said first node and a third node connecting said first resistor to said second resistor; and
   a regulator controller having an input connected to receive said second control signal output from said synchronous signal discrimination means and an output connected to said third node.

8. A power saving display device comprising:

power rectification means for converting commercial alternating current power into direct current power;

main power supply means for converting an output voltage from said power rectification means into desired voltages to be supplied to components in said display device;

synchronous signal discrimination means for generating first and second control signals for power management control by discriminating whether horizontal and vertical synchronous signals are input to said power saving display device, said first control signal generated to interrupt the operation of said main power supply means when only the horizontal synchronous signal is input or when neither the horizontal nor vertical synchronous signals are input;

main power interruption means for interrupting operation of said main power supply means in response to said first control signal from said synchronous signal discrimination means;

auxiliary power supply means being continuously operated in response to an output voltage from said power rectification means even when said main power supply means' operation is interrupted;

heater power regulation means for providing an input voltage to a heater of a cathode ray tube in response to the second control signal from said synchronous signal discrimination means having a first value, and for stopping said input voltage from being provided to said heater in response to the second control signal from said synchronous signal discrimination means having a second value; and heater power connection means for supplying an output voltage from said auxiliary power supply means to said heater power regulation means as said input voltage when said main power supply means' operation is interrupted and when said main power supply means' operation is not interrupted.

9. A power saving display device comprising:

power rectification means for converting commercial alternating current power into direct current power;

main power supply means for converting an output voltage from said power rectification means into desired voltages to be supplied to components in said display device;

synchronous signal discrimination means for generating first and second control signals for power management control by discriminating whether horizontal and vertical synchronous signals are input to said display device;

main power interruption means for interrupting operation of said main power supply means in response to said first control signal from said synchronous signal discrimination means;

auxiliary power supply means being continuously operated in response to an output voltage from said power rectification means even when said main power supply means' operation is interrupted;

heater power regulation means for providing and input voltage to a heater of a cathode ray tube in response to the second control signal from said synchronous signal discrimination means having a first value, and for stopping said input voltage form being provided to said heater in response to the second control signal from said synchronous signal discrimination means having a second value; and heater power connection means for supplying an output voltage form said auxiliary power supply means to said heater power regulation means as said input voltage when said main power supply means' operation is interrupted and when said main power supply means' operation is not interrupted, wherein said heater power regulation means comprises:

a regulator circuit having a first input terminal connected to an output terminal of said heater power connection means and a second input connected to a ground terminal via a first resistor and a second resistor connected in series;

a variable resistor connected between said input terminal and a node connecting said first resistor to said second resistor; and a regulator controller having an input connected to receive said second control signal output from said synchronous signal discrimination means and an output connected to said node.

10. The power saving display device as set forth in claim 9, wherein said heater power connection means comprises:

a diode having a cathode connected to an output of said auxiliary power supply means and an anode connected to said first input terminal of said regulator; and a capacitor connected between said anode of said diode and said ground terminal.

11. A method for controlling power of a display device, said method comprising the steps of:

determining whether horizontal and vertical synchronous signals are input to said display device;

interrupting main power when it is determined that only said horizontal synchronous signal is input or when it is determined that neither the horizontal nor vertical synchronous signals are input; and supplying auxiliary power to a heater of a cathode ray tube when said main power is interrupted.

12. The method as set forth in claim 11, wherein said step of supplying auxiliary power to said heater is performed by heater power connection means, said heater power connection means comprising at least one diode.

13. The method as set forth in claim 11, wherein said auxiliary power is continuously supplied form an auxiliary power supply circuit.

* * * * *